(12) United States Patent
Tomizu et al.

(10) Patent No.: US 10,795,492 B2
(45) Date of Patent: Oct. 6, 2020

(54) INPUT DEVICE AND METHOD FOR CONTROLLING INPUT DEVICE

(71) Applicant: KYOCERA Corporation, Kyoto-shi, Kyoto (JP)

(72) Inventors: Makoto Tomizu, Yokohama (JP); Takayuki Shinozaki, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/709,662

(22) Filed: Sep. 20, 2017

(65) Prior Publication Data

US 2018/0011591 A1 Jan. 11, 2018

Related U.S. Application Data

(63) Continuation of application No. 14/354,172, filed as application No. PCT/JP2012/005121 on Aug. 10, 2012, now Pat. No. 9,798,410.

(30) Foreign Application Priority Data

Oct. 27, 2011 (JP) ................................ 2011-236534

(51) Int. Cl.
*G09G 1/00* (2006.01)
*G06F 3/041* (2006.01)
(Continued)

(52) U.S. Cl.
CPC ............ *G06F 3/0416* (2013.01); *G06F 3/016* (2013.01); *G06F 3/0414* (2013.01); *G06F 3/04883* (2013.01); *G06F 2203/04105* (2013.01)

(58) Field of Classification Search
CPC . G06F 3/041; G06F 3/02; G06F 17/24; G06F 3/048; G09G 5/00
See application file for complete search history.

(56) References Cited

U.S. PATENT DOCUMENTS 8,760,423 B2 6/2014 Ohta
9,292,199 B2 * 3/2016 Choi ................. G06F 3/04883
(Continued)

FOREIGN PATENT DOCUMENTS

JP 6-59802 A 3/1994
JP 7-168664 A 7/1995
(Continued)

OTHER PUBLICATIONS

Office Action dated Sep. 18, 2012, corresponds to Japanese patent application No. 2012-536638, for which an explanation of relevance is attached.
(Continued)

*Primary Examiner* — Michael A Faragalla
(74) *Attorney, Agent, or Firm* — Hauptman Ham, LLP

(57) ABSTRACT

An input device includes a touch sensor, a pressure detection unit configured to detect pressure on the touch sensor, and a control unit that performs control to execute predetermined processing when, in a state such that the touch sensor detects contact inside a predetermined region, data based on pressure detected by the pressure detection unit satisfies a predetermined standard, and performs control not to execute the predetermined processing when, in a state such that the data based on pressure detected by the pressure detection unit satisfies a predetermined standard, the touch sensor detects contact that transitions from outside the predetermined region to inside the predetermined region.

3 Claims, 8 Drawing Sheets

(51) Int. Cl.
*G06F 3/0488* (2013.01)
*G06F 3/01* (2006.01)

(56) References Cited

U.S. PATENT DOCUMENTS

| | | | | |
|---|---|---|---|---|
| 2007/0277125 | A1* | 11/2007 | Shin | G06F 3/04883 |
| | | | | 715/863 |
| 2009/0058823 | A1* | 3/2009 | Kocienda | G06F 3/0236 |
| | | | | 345/173 |
| 2010/0007675 | A1* | 1/2010 | Kang | G06F 3/04883 |
| | | | | 345/592 |
| 2010/0283754 | A1* | 11/2010 | Nakao | G06F 3/04847 |
| | | | | 345/173 |
| 2011/0154246 | A1* | 6/2011 | Oh | G06F 3/04886 |
| | | | | 715/773 |
| 2011/0279395 | A1 | 11/2011 | Kuwabara et al. | |
| 2012/0154316 | A1 | 6/2012 | Kono | |

FOREIGN PATENT DOCUMENTS

| | | |
|---|---|---|
| JP | 8-221202 A | 8/1996 |
| JP | 2006-311224 A | 11/2006 |
| JP | 2008-276369 A | 11/2008 |
| JP | 2010-176337 A | 8/2010 |
| JP | 2011-134359 A | 7/2011 |
| JP | 2011-209964 A | 10/2011 |
| WO | 2011/024388 A1 | 3/2011 |

OTHER PUBLICATIONS

Office Action dated Nov. 13, 2012, corresponds to Japanese patent application No. 2012-536638, for which an explanation of relevance is attached.
Office Action dated Jul. 2, 2013, corresponds to Japanese patent application No. 2012-536638, for which an explanation of relevance is attached.
International Search Report for PCT/JP2012/005121 dated Sep. 11, 2012.

* cited by examiner

INPUT DEVICE AND METHOD FOR CONTROLLING INPUT DEVICE

CROSS-REFERENCE TO RELATED APPLICATION

The present application is a continuation of U.S. patent application Ser. No. 14/354,172 filed on Apr. 25, 2014, which is a National Phase of International Application Number PCT/JP2012/005121, filed Aug. 10, 2012, and claims priority to and the benefit of Japanese Patent Application No. 2011-236534 filed Oct. 27, 2011. The disclosures of all the above-listed prior-filed applications are hereby in incorporated by reference herein in their entirely.

TECHNICAL FIELD

The present invention relates to an input device provided with a touch sensor and to a method for controlling an input device.

BACKGROUND

For mobile terminals such as mobile phones, for example, a variety of input devices allowing users to operate the terminals have been developed according to the function and usage of each of the terminals. Often, the input devices are configured such that a user performs an input operation by directly depressing mechanical keys or buttons, prearranged on the surface of the body of the mobile terminal, with a finger or the like.

Such mechanical keys (for example, a numeric keypad) of the input device in the terminal are normally prearranged to suit the primary usage of the terminal. Accordingly, the initially prescribed physical arrangement of such keys cannot generally be changed afterward.

Recently, a variety of functions have been incorporated into small mobile terminals, such as a digital camera function and a music player function incorporated into mobile phones. Like mobile phones, some terminals have numerous supplementary functions incorporated therein in addition to the main usage of the terminal, whereas some single terminals, including PDAs (Personal Digital Assistant: mobile information terminal), smartphones, and tablet terminals have a plurality of main usages such as schedule management, an address book, and the like. If the keys of such terminals are fixedly arranged, it may inconvenience users significantly when performing an input operation, depending on the function used.

In order to resolve such inconvenience during input operations, some input devices such as an operation unit, switches, or the like for detecting an input operation by the user are provided with a touch sensor such as a touch panel, touch switch, or the like (for example, see Patent Literature 1). The input device having such a touch panel generally displays images of operation keys, buttons, or the like, as well as a character or character string to prompt for user input (referred to below as an "object") on a display screen of the touch panel. When the user presses an object displayed on the display screen, an input unit (touch sensor) at a corresponding position on the touch panel detects the contact.

A variety of types of such a touch sensor are known, including a resistive film type, a capacitive type, and an optical type. All of these types of touch sensors, however, simply detect contact by a finger or stylus pen. Upon being contacted, the touch sensor itself is not physically displaced like a mechanical push-button switch.

The mobile phone described in Patent Literature 1 can display objects arranged in a desired manner on the display screen of the touch panel and detect contact by the user. This mobile phone also allows for free arrangement of keys and the like. Accordingly, when switching between functions of the terminal, this mobile phone can provide excellent operability by freely changing the arrangement of the objects to suit the functions. For example, when the user uses the digital camera function incorporated into the mobile phone, the mobile phone can display an object constituting an operation unit of a digital camera on the touch panel and detect user operation. By contrast, when the user inputs characters for an e-mail or the like using the mobile phone, the mobile phone can display an object constituting a keyboard similar to that of a personal computer (PC) on the touch panel and detect contact. In this way, by including the touch panel, this mobile phone can detect a user operation while optimizing a single input device for each of a plurality of functions.

In addition, since the input device including the touch panel detects contact by the user directly contacting (touching), with a fingertip or the like, an object displayed on the display unit, the user can perform operations in a highly intuitive manner. In other words, the user performs operations by directly contacting, with a fingertip or the like, the object displayed on the screen, following guidance displayed on the screen of the touch panel. Accordingly, the user can cause the terminal to execute processing extremely easily with an intuitive operation, following the guidance displayed on the screen. Hence, an effect of reducing erroneous operations can be expected.

Since a touch panel thus has the advantages of enhancing flexibility in configuring the input unit and of allowing the user to perform an input operation in a highly intuitive manner, the number of the terminal devices including an input device provided with such a touch panel is increasing.

Input devices having the above-described touch panels are now commonly used not only in mobile terminals, but also, for example, Automatic Teller Machines (ATMs) at banks and the like, and ticket vending machines at places such as train stations. Additionally, in stores such as fast-food shops, clerks use terminal devices provided with an input device having the above-described touch panel to process orders from customers. Using the touch panel in the input device eliminates the need for mechanical operation buttons or keys, such as a keyboard separate from the touch panel. Accordingly, since only a small area on the body of the terminal device is required for arrangement of mechanical buttons and the like, the terminal device can be reduced in overall size. Therefore, the degree of freedom for the location to install the terminal device in shops, train stations, and the like increases.

CITATION LIST

Patent Literature 1: JP 2006-311224 A

SUMMARY

An input device having such a touch sensor can detect a variety of forms of input operations that would be difficult to perform with an input device having a regular keyboard or the like. For example, an input device having a touch sensor can detect an input operation whereby the user contacts the touch face, and while maintaining contact, displaces the contact along the touch face, i.e. slide input. Slide input is a characteristic input format unique to a touch sensor. Depending on the form of the input operation, slide input allows for an extremely convenient, easy, and intuitive input operation.

An input device having a touch sensor, however, generally starts to execute predetermined processing based on contact to the touch face corresponding to a position at which an object, such as a key or the like, is displayed. Therefore, the user providing slide input needs to be careful with the path of the finger that is slid. When the user is providing slide input while aiming for a final position, the user may not be particularly aware of the locations traversed during the slide input. By thus performing an operation focusing only on the final position of the slide input, the user runs the risk of starting execution of unintended processing. An example of such a case is described below.

FIGS. 8A to 8D schematically illustrate an example of a form of processing by a known input device provided with a touch sensor. This example is assumed to be a situation where the user uses an input device provided with a touch sensor to perform an input operation for an online transfer at an Internet site for a bank or the like. FIGS. 8A to 8D show the display on the touch panel of a mobile terminal, such as a mobile phone, or an ATM terminal or the like installed in a bank or other facility. When an object such as a key, button, or the like is displayed on the touch panel, the input device can detect an operation by which, with a finger or the like, the user directly contacts the touch panel (touch sensor) displaying the object.

FIG. 8A illustrates the state after the user inputs the transfer amount by an input operation using a numeric key or the like. Suppose the user has input the digits for an amount of money of 100,000 yen as the transfer amount. As shown in FIG. 8A, the input device displays an object for an "input complete" button in the lower-left corner. Once the user has finished inputting an amount, the input device detects contact when the user performs an operation to contact the "input complete" button directly.

FIG. 8B shows a state in which the screen display of the touch panel has transitioned to a pre-transfer confirmation screen, since the user has pressed the "input complete" button in FIG. 8A. In this case, the input device can detect contact by the user on the "transfer" button, which is for executing the transfer of the input amount of money. Before actually executing the transfer, however, it is assumed that the user might notice a mistake in the transfer amount and correct the transfer amount. By detecting user contact to the "correction" button for correcting input of the transfer amount, this input device allows the user to input the transfer amount again. In other words, in FIG. 8B, after releasing the finger from the touch sensor, the user can then press the "correction" button to input the transfer amount again.

Due to the pressing of the "input complete" button in FIG. 8A, however, the screen has switched as shown in FIG. 8B, and the position of objects has changed. Therefore, suppose that the user has performed slide input from the state in which the "input complete" button is pressed in FIG. 8A directly to the "correction" button in FIG. 8B. When the user provides such slide input, then as illustrated in FIG. 8B, the slide input traverses the "transfer" button before reaching the "correction" button at the final position. As described above, an input device having a touch sensor generally starts to execute predetermined processing based on contact to the touch face corresponding to a position at which an object, such as a button or the like, is displayed.

Accordingly, in this case, before the user's slide input reaches the "correction" button, the "transfer" button is contacted. Hence, the input device ends up starting execution of processing corresponding to the "transfer" button, as illustrated in FIG. 8C. As a result, even though the user wanted to press the "correction" button, the input device ends up starting transfer processing based on the contact to the "transfer" button, and as illustrated in FIG. 8D, transfer processing is completed against the user's will.

In this way, when a finger that the user is sliding contacts a location at which contact is detected, execution of processing corresponding to that location starts regardless of the user's intent. Accordingly, the user needs to pay attention to movement of the sliding finger when providing slide input using a touch sensor, or else an unintended operation may be detected, with execution of processing starting against the user's will. From the perspective of the input device, such processing is normal processing in accordance with prescribed procedures, yet from the user's perspective, such processing is considered unintentional. The execution of such processing can become extremely stressful for the user.

In greater detail, when such an input device is applied to a small mobile terminal, the area of the touch sensor is limited by the need for an overall compact housing, yet from the perspective of ensuring operability, the objects such as buttons cannot be made too small. Therefore, especially in a small mobile terminal, the above-described problem is considered to occur easily, and it is assumed that execution of processing not intended by the user will occur more frequently.

In order to address the above-described problem, one idea is to provide the above-described known input device with a pressure detection unit that detects pressure on the touch sensor. In other words, one approach is for the input device not to start execution of corresponding processing upon the detection of mere contact to an object, such as a button, but rather to start execution of corresponding processing once the pressure detection unit has detected pressure of a predetermined standard. Based on the setting of the predetermined standard, this input device does not react only to light contact to an object, such as a button, but rather reacts when an object, such as a button, is pushed down with pressure having a force that exceeds the predetermined standard. With such an input device, execution of predetermined processing based on contact does not start at the moment the contact is detected. Therefore, it is thought that execution of processing not intended by the user can be prevented from starting.

When using such an input device, however, if the pressure when the user contacts the above-described "input complete" button in FIG. 8A exceeds a predetermined standard, and the user then provides slide input still accompanied by predetermined pressure in the state in FIG. 8B, the result is the same as in the above-described example. In other words, in this case, when the finger performing the slide input operation traverses the position of the "transfer" button in FIG. 8B, pressure satisfying a predetermined standard is detected. Accordingly, the input device detects an operation on the "transfer" button as illustrated in FIG. 8C and completes transfer processing against the user's will, as illustrated in FIG. 8D.

The present invention has thus been conceived in light of the above circumstances and provides an input device, as well as a method for controlling an input device, that can prevent execution of processing based on input not intended by the user when detecting slide input on a touch sensor.

An input device according to a first aspect of the present invention includes a touch sensor; a pressure detection unit configured to detect pressure on the touch sensor; and a control unit configured to perform control to execute predetermined processing when, in a state such that the touch sensor detects contact inside a predetermined region, data based on pressure detected by the pressure detection unit satisfies a predetermined standard, and to perform control not to execute the predetermined processing when, in a state such that the data based on pressure detected by the pressure detection unit satisfies a predetermined standard, the touch sensor detects contact that transitions from outside the predetermined region to inside the predetermined region.

An input device according to a second aspect of the present invention includes a touch sensor; a pressure detection unit configured to detect pressure on the touch sensor; and a control unit configured to perform control to execute predetermined processing when, in a state such that the touch sensor detects contact inside a predetermined region, data based on pressure detected by the pressure detection unit satisfies a first standard, and to perform control to execute the predetermined processing when, in a state such that the data based on pressure detected by the pressure detection unit satisfies the first standard, the touch sensor detects contact that transitions from outside the predetermined region to inside the predetermined region and the data based on pressure detected by the pressure detection unit satisfies a second standard higher than the first standard.

A third aspect of the present invention is the input device according to the second aspect of the present invention, such that the control unit sets the second standard in accordance with data based on pressure satisfying the first standard.

An input device according to a fourth aspect of the present invention executes predetermined processing when a contacting object presses inside a predetermined region of a touch sensor and that does not execute the predetermined processing when the contacting object, while pressing the touch sensor, transitions from outside the predetermined region to inside the predetermined region.

A method for control according to a fifth aspect of the present invention causes an input device to execute predetermined processing when a contacting object presses inside a predetermined region of a touch sensor and not to execute the predetermined processing when the contacting object, while pressing the touch sensor, transitions from outside the predetermined region to inside the predetermined region.

According to the input device of the present invention, predetermined processing is executed when, in a state such that contact is detected inside a predetermined region, data based on pressure satisfies a predetermined standard. Furthermore, according to the input device of the present invention, the predetermined processing is not executed when, in a state such that the data based on pressure satisfies a predetermined standard, contact that transitions from outside the predetermined region to inside the predetermined region of the touch sensor is detected. Accordingly, even when slide input accompanied by predetermined pressure slides to the position of an object, predetermined processing is not executed, thereby preventing execution of processing based on input not intended by the user.

Furthermore, according to an embodiment of the present invention, the predetermined processing is executed when, in a state such that the data based on pressure satisfies the first standard, contact that transitions from outside the predetermined region to inside the predetermined region of the touch sensor is detected and the data based on pressure satisfies a second standard higher than the first standard. Accordingly, when slide input accompanied by predetermined pressure slides to the position of an object, predetermined processing is executed based on an intentional user operation accompanied by strong pressure, thereby preventing execution of processing based on input not intended by the user.

BRIEF DESCRIPTION OF DRAWINGS

The present invention will be further described below with reference to the accompanying drawings, wherein.

DESCRIPTION OF EMBODIMENTS

The following describes embodiments of the present invention with reference to the drawings. The input device according to the present embodiment may be applied to the input device used in a mobile terminal such as a mobile phone, in a smart phone, in a tablet, or in a car navigation system, as well as the input device used in a variety of apparatuses, such as industrial devices (factory automation equipment), audio devices and other sound equipment, electronic instruments, household appliances, gaming devices, ticket vending machines, and the like, and to a wide variety of other input terminals.

Embodiment 1

Figure 1:
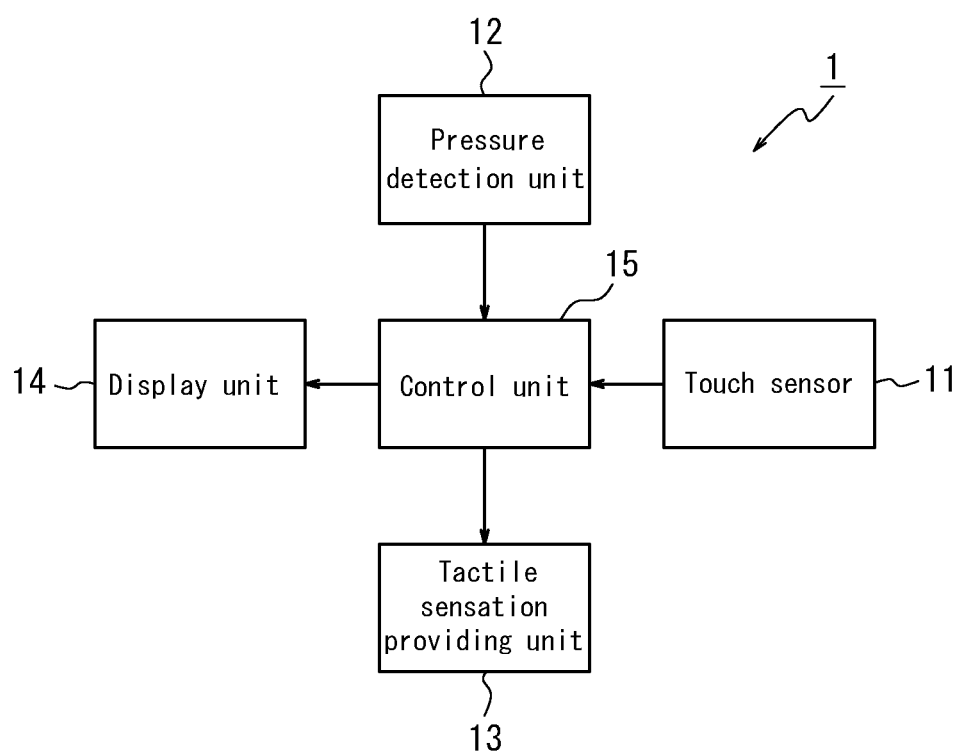
FIG. 1 is a block diagram schematically illustrating the configuration of an input device according to Embodiment 1 of the present invention.

FIG. 1 is a block diagram schematically illustrating the configuration of an input device according to Embodiment 1 of the present invention.

As illustrated in FIG. 1, an input device 1 according to Embodiment 1 includes a touch sensor 11, pressure detection unit 12, tactile sensation providing unit 13, display unit 14, and control unit 15. The control unit 15 is a processor that controls the overall processing of the input device 1, starting with the functional units.

The touch sensor 11 is normally provided on the front face of the display unit 14 and detects, on a corresponding touch face of the touch sensor 11, contact by the user's finger or the like to a key, button, or the like (referred to below simply as a "key or the like") displayed on the display unit 14. Based on output from the touch sensor 11, the control unit 15 can learn the position at which contact was detected on the touch sensor 11. The touch sensor 11 is of a well-known type, such as a resistive film type, capacitive type, optical type, or the like. To refer to detection of contact on the touch sensor 11 at a position corresponding to a position at which an object is displayed on the display unit 14, abbreviations such as "detecting contact at the position of an object", "contacting an object", or the like are used below as appropriate.

The pressure detection unit 12 detects pressure when the user performs an operation on the touch sensor 11 and is configured using, for example, a device or the like such as a strain gauge sensor, a piezoelectric element, or the like that experiences a change in physical or electrical characteristics (strain, resistance, voltage, or the like) in response to pressure. When the pressure detection unit 12 is configured using a piezoelectric element or the like, for example, the magnitude of the voltage (voltage value (referred to below as data based on pressure)), which is an electrical characteristic, of the piezoelectric element changes in accordance with the magnitude of the load (force) of the pressure on the touch sensor 11 (or the speed at which the magnitude of the load (force) changes (acceleration)). When data based on pressure is at least a predetermined threshold, the control unit 15 performs control to execute predetermined processing based, for example, on an application.

The control unit 15 acquires the data based on pressure by the pressure detection unit 12 notifying the control unit 15 of the data based on pressure, or by the control unit 15 detecting data based on pressure of the pressure detection unit 12. In other words, the control unit 15 acquires the data based on pressure on the touch sensor 11 from the pressure detection unit 12. Note that instead of a voltage value, the data based on pressure may be power, resistance, magnitude of the load, or the like related to the pressure.

Alternatively, the pressure detection unit 12 may measure the change in the gap between the touch sensor 11 and the display unit 14 occurring when the touch sensor 11 is pressed by the user. In this case, the data based on pressure corresponds to the value of the change in the gap. Alternatively, the pressure detection unit 12 may measure the change in the gap between the touch sensor 11 and another component, such as a circuit board.

Furthermore, the pressure detection unit 12 can be configured in accordance with the contact detection type of the touch sensor 11. For example, if the touch sensor 11 is a resistive film type, a configuration without a strain gauge sensor, piezoelectric element, or the like may be adopted by associating the magnitude of the resistance that corresponds to the size of the contact area with the load (force) of the pressure on the contact face of the touch panel. Alternatively, if the touch sensor 11 is a capacitive type, a configuration without a strain gauge sensor, a piezoelectric element, or the like may be adopted by associating the magnitude of the capacitance with the load (force) of the pressure on the touch panel.

The tactile sensation providing unit 13 vibrates the touch sensor 11 and may be configured using, for example, a piezoelectric vibrator or the like. Via the tactile sensation providing unit 13, vibration can be transmitted to a finger, stylus pen, or the like (contacting object) in contact with the touch sensor 11. The tactile sensation providing unit 13 can also be configured to vibrate the touch face of the touch sensor 11 indirectly by transmitting vibration to the input device 1 via a vibration motor (eccentric motor) or the like.

By vibrating the tactile sensation providing unit in response to pressure detected by the pressure detection unit 12 (pressure on the touch sensor 11), the tactile sensation providing unit 13 can generate vibration and provide a tactile sensation to the user's finger or the like, thereby providing the user pressing the touch sensor 11 with a sensory understanding that an operation has been performed.

The pressure detection unit 12 may be configured integrally with the tactile sensation providing unit 13. Especially when the pressure detection unit 12 and the tactile sensation providing unit 13 are both configured using a piezoelectric element, a pressure detection unit/tactile sensation providing unit can be configured to share the same piezoelectric element. The reason is that a piezoelectric element generates voltage when pressure is applied and deforms upon application of voltage.

The tactile sensation providing unit 13 can also be configured to generate vibration by driving a piezoelectric element, which also serves as the pressure detection unit 12, when the magnitude of the voltage (voltage value (data)) of the piezoelectric element satisfies a predetermined standard. Stating that the magnitude of the voltage (voltage value (data)) of the piezoelectric element satisfies a predetermined standard may refer to the voltage value (data) reaching a predetermined standard, to the voltage value (data) exceeding a predetermined standard, or to detection of a voltage value (data) equivalent to a predetermined standard.

The display unit 14 displays a variety of objects and the like, starting with objects for input, and is configured using a liquid crystal display (LCD), an organic EL display, or the like. In the present embodiment, the display unit 14 renders and displays objects based on application software.

Figure 2A:
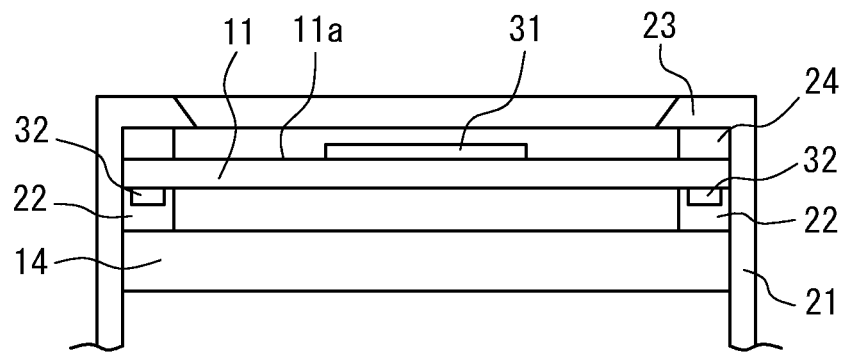
FIGS. 2A to 2B illustrate an exemplary housing structure of the input device according to Embodiment 1.
Figure 2B:
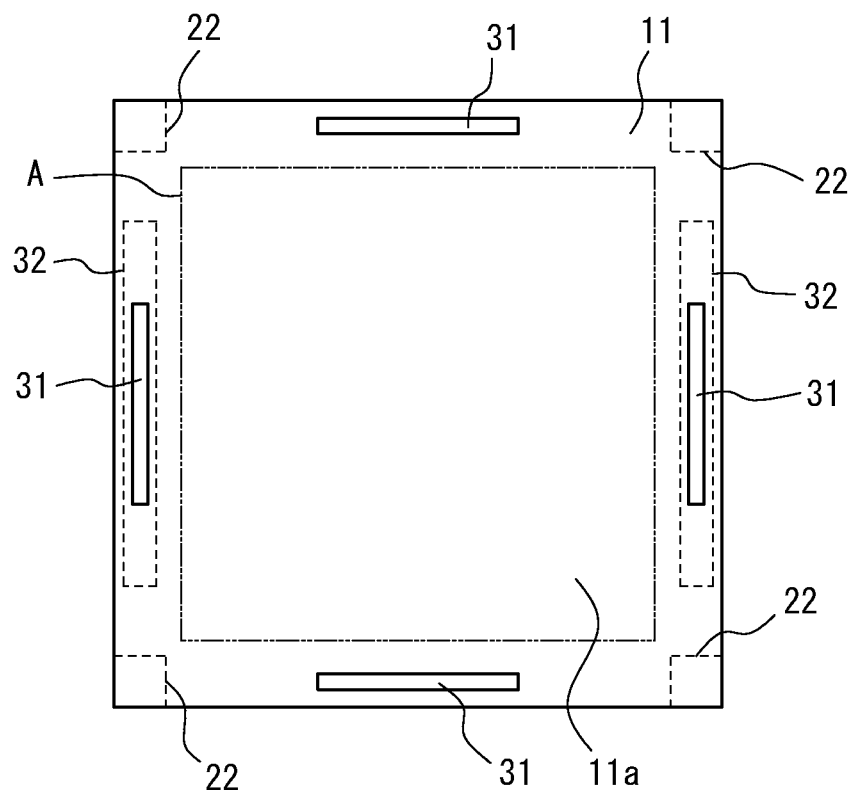

FIGS. 2 and 2B illustrate an exemplary housing structure of the input device 1 illustrated in FIG. 1. FIG. 2A is a cross-sectional diagram of the main portions, and FIG. 2B is a plan view of the main portions. The display unit 14 is contained in a housing 21. The touch sensor 11 is held on the display unit 14 via insulators 22 made of elastic members. Note that the display unit 14 and the touch sensor 11 in the input device 1 according to the present embodiment are shown as rectangles in plan view. The shape of the display unit 14 and the touch sensor 11, however, may be suited to a variety of specifications, such as the shape of the housing. In the present embodiment, the touch sensor 11 is held on the display unit 14 via the insulators 22 arranged at four corners outside a display area A of the display unit 14 illustrated by a phantom line in FIG. 2B.

The housing 21 is provided with an upper cover 23 covering a surface area of the touch sensor 11 outside the display area of the display unit 14. An insulator 24 made from an elastic member is also provided between the upper cover 23 and the touch sensor 11.

The touch sensor 11 illustrated in FIGS. 2A and 2B has a surface member, configured for example using a transparent film or glass, and has a rear face member configured using glass or acryl. The surface member includes a touch face 11a. The touch sensor 11 is preferably structured so that when the touch face 11a is pressed, the pressed part bends (strains) slightly in response to the pressure force, or the entire structure bends slightly.

Strain gauge sensors 31 for detecting the load (pressure force) applied to the touch sensor 11 are provided, by attachment or the like, on the surface of the touch sensor 11 near each side thereof at a position covered by the upper cover 23. Furthermore, piezoelectric vibrators 32 for vibrating the touch sensor 11 are provided, by attachment or the like, on the rear face of the touch sensor 11 near two opposing sides thereof. In other words, in the input device illustrated in FIGS. 2A and 2B, the pressure detection unit 12 illustrated in FIG. 1 is configured using four strain gauge sensors 31, and the tactile sensation providing unit 13 is configured using two piezoelectric vibrators 32. The tactile sensation providing unit 13 vibrates the touch face 11a by vibrating the touch sensor 11. Note that in FIG. 2B, the housing 21, upper cover 23, and insulator 24 illustrated in FIG. 2A are omitted.

Figure 3:
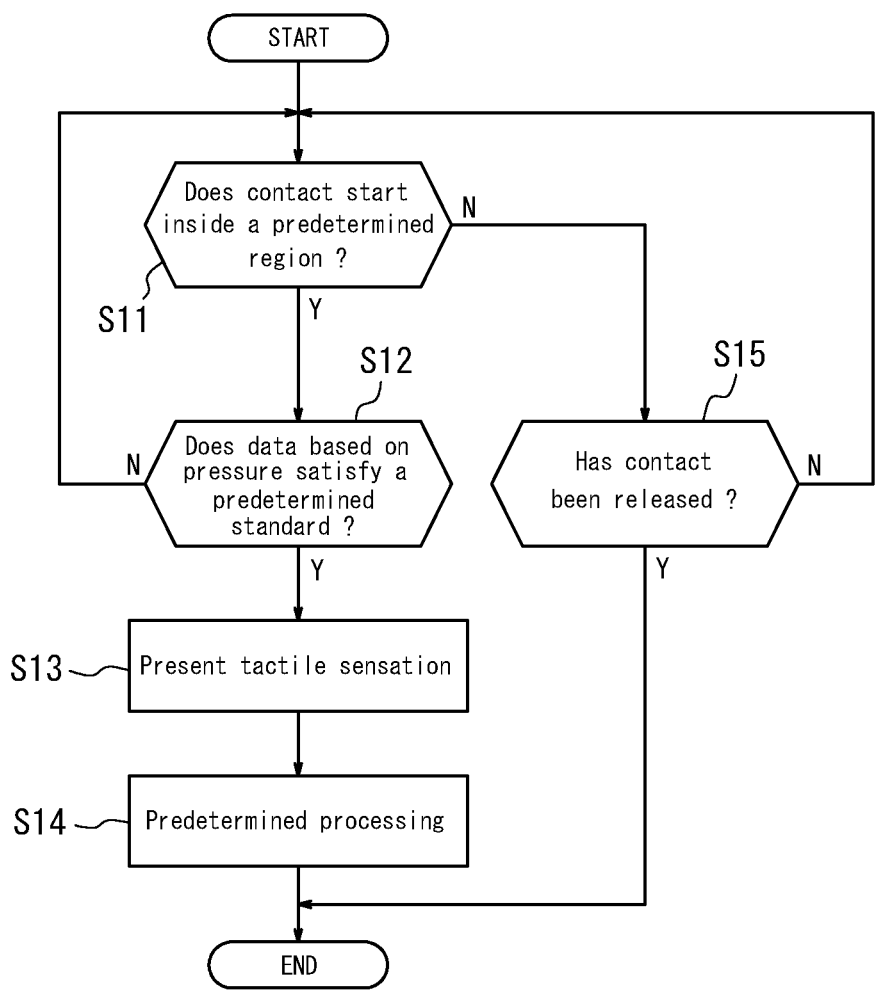
FIG. 3 is a flowchart illustrating processing by the input device according to Embodiment 1.

FIG. 3 is a flowchart illustrating control processing for slide input in the input device according to Embodiment 1.

Control processing for slide input according to Embodiment 1 starts at the point when the touch sensor 11 detects contact by the user's finger or the like. Once the touch sensor 11 detects user contact, the control unit 15 determines whether the contact is detected inside a predetermined region (step S11). In the present embodiment, the above "predetermined region" refers to a location where an object for which contact is to be detected, such as a key or the like, is displayed on the display unit 14. Accordingly, when contact is detected inside the predetermined region, contact is detected in a region of the touch sensor 11 corresponding to the location where an object for which contact is to be detected, such as a key or the like, is displayed on the display unit 14.

When contact is determined to be detected inside the predetermined region in step S11, the control unit 15 determines whether data based on pressure detected by the pressure detection unit 12 satisfies a predetermined standard (step S12). Note that the pressure detection unit 12 detects the load from, for example, the average of output from the four strain gauge sensors 31 illustrated in FIGS. 2A and 2B. As the predetermined standard that the data based on pressure satisfies, a standard corresponding to a value of 1 N (newton) or the like, for example, is preferably set in advance taking into consideration data based on pressure when the user performs a regular push operation, and the setting can preferably be changed subsequently. So that the predetermined standard is not satisfied when the user performs light, unintentional contact, and in order to impart a sense of pressure to the user to provide a realistic tactile sensation, the standard is not set excessively low, taking into consideration the pressure at the time of intentional pressure input by the user (for example, an average value or the like). Note that even if contact is detected inside the predetermined region in step S11, if the data based on pressure detected by the pressure detection unit 12 in step S12 does not satisfy the predetermined standard, the control unit 15 returns to step S11 and continues processing.

In step S12, when the data based on pressure detected by the pressure detection unit 12 satisfies the predetermined standard (when the touch sensor 11 is pressed), the control unit 15 controls the tactile sensation providing unit 13 to provide a tactile sensation (step S13) and performs control to execute predetermined processing (step S14). In other words, in the present embodiment, the control unit 15 performs control to execute predetermined processing when, in a state such that the touch sensor 11 detects contact inside the predetermined region, data based on pressure detected by the pressure detection unit 12 satisfies a predetermined standard (i.e. when the contacting object presses inside the predetermined region of the touch sensor 11). In step S13, the control unit 15 drives the tactile sensation providing unit 13 with a predetermined drive signal so as to vibrate the touch sensor 11 with a preset, predetermined vibration pattern and provide a tactile sensation. Via this vibration, the user can recognize that the user's input operation has been detected normally by the input device 1.

Figure 8A:
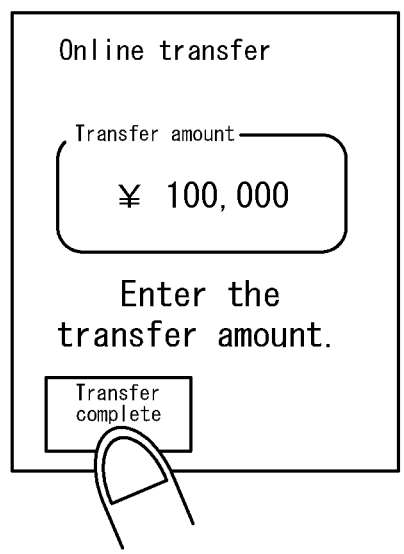
FIGS. 8A to 8D schematically illustrate an example of a form of processing by a known input device.
Figure 8B:
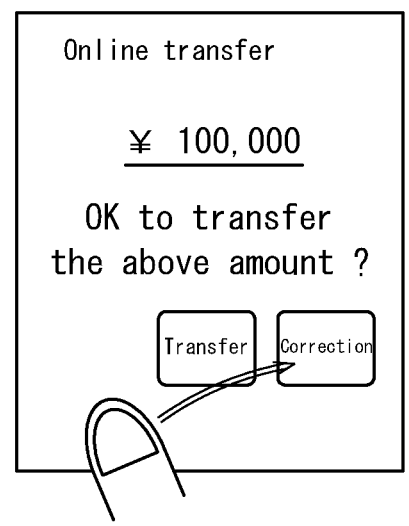
Figure 8C:
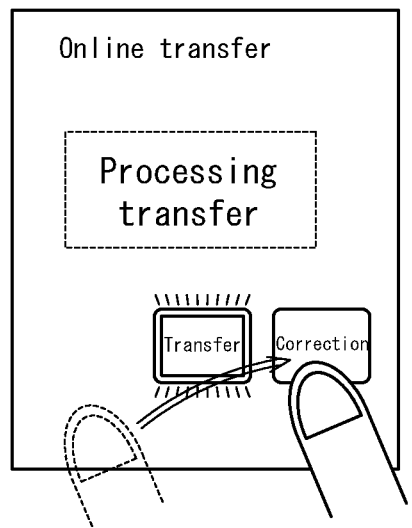
Figure 8D:
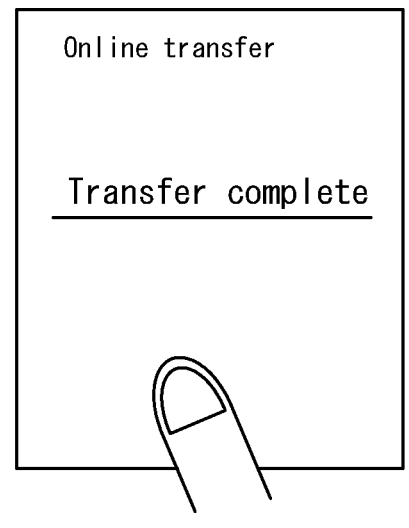

The "predetermined processing" in step S14 refers to processing that is prescribed in advance and associated with the object for which contact was detected. For example, when the object for which contact was detected is a key for character input, the control unit 15 executes processing to display (output) the character. In the above-described example illustrated in FIGS. 8A to 8D, when the object for which contact is detected is the "input complete" object in FIG. 8A, the control unit 15 executes processing to transition to the confirmation screen in FIG. 8B. When the object for which contact is detected is the "transfer" object in FIG. 8B, the control unit 15 executes processing for the transfer, and in the case of input to the "correction" object, executes processing for correction.

With the above processing, when the data based on pressure detected at the position of an object does not satisfy the predetermined standard, processing is not executed. Therefore, even if the user lightly contacts an object unintentionally, execution of processing based on input not intended by the user is avoided. The input device 1 stimulates the sense of pressure until the data based on pressure applied to the touch sensor 11 satisfies a standard for providing a tactile sensation (for example, a standard corresponding to 1 N), and upon the data based on pressure satisfying the standard, the input device 1 stimulates the sense of touch by driving the piezoelectric vibrators 32 with a predetermined drive signal to vibrate the touch face 11a. In this way, the input device 1 can, for example, provide a realistic click sensation similar to that obtained when pushing a button switch such as a push-button switch (push-type button switch).

On the other hand, when the contact is determined to be detected outside the predetermined region in step S11, the control unit 15 determines whether contact has been released by the user separating the finger or the like from the touch sensor 11 (step S15). In the present embodiment, outside the "predetermined region" refers to a location where an object for which contact is to be detected, such as a key or the like, is not displayed on the display unit 14. Accordingly, when contact is detected outside the predetermined region, contact is detected in a region of the touch sensor 11 corresponding to a location where an object for which contact is to be detected, such as a key or the like, is not displayed on the display unit 14.

When contact has not been released in step S15, the control unit 15 returns to step S11 and continues processing. On the other hand, when contact has been released in step S15, the control unit 15 terminates the processing of the present embodiment without executing the processing in step S13 or the processing in step S14, i.e. without executing processing corresponding to the input operation. In other words, in the present embodiment, the control unit 15 performs control not to execute the predetermined processing when, in a state such that the data based on pressure detected by the pressure detection unit 12 satisfies a predetermined standard, the touch sensor 11 detects contact that transitions from outside the predetermined region to inside the predetermined region (i.e. when the contacting object, while pressing, transitions from outside the predetermined region to inside the predetermined region of the touch sensor 11). Accordingly, even when slide input slides to the position of an object while the data based on pressure still satisfies the predetermined standard, predetermined processing is not executed, thereby preventing execution of processing based on an input operation not intended by the user.

FIGS. 4A to 4D schematically illustrate an example of a form of processing by the input device according to Embodiment 1. FIGS. 4A to 4D illustrates the situation of processing by the input device described in FIGS. 8A to 8d above as applied to the input device 1 of the present embodiment. In other words, a situation is described where the user uses the input device 1 of the present embodiment to perform an input operation for an online transfer at an Internet site for a bank or the like.

Figure 4A:
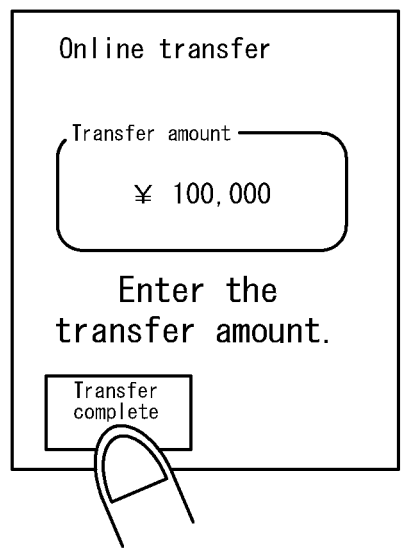
FIGS. 4A to 4D schematically illustrate an example of a form of processing by the input device according to Embodiment 1.

FIG. 4A illustrates the state after the user inputs the transfer amount by an input operation using a numeric key or the like. Suppose the user has input the digits for an amount of money of 100,000 yen as the transfer amount. As shown in FIG. 4A, the input device 1 displays an object for an "input complete" button in the lower-left corner of the display unit 14. Once the user finishes inputting the amount, the input device 1 detects contact to the "input complete" object (step S11), and once contact is detected, determines whether data based on pressure accompanying the contact satisfies a predetermined standard (step S12).

Figure 4B:
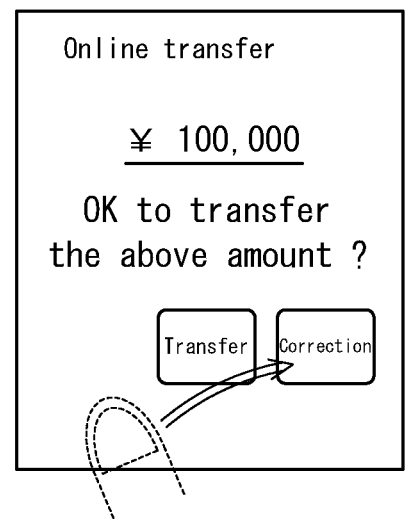

Once the data based on pressure accompanying contact to the "input complete" object satisfies the predetermined threshold, the input device 1 provides a tactile sensation with the tactile sensation providing unit 13 (step S13) and displays the confirmation screen shown in FIG. 4B on the display unit 14 (step S14). In this way, using the input device 1, the user can perform almost the same input operation as when using the known input device illustrated in FIGS. 8A to 8D. The input device illustrated in FIGS. 8A to 8D differs, however, in that execution of predetermined processing starts by an operation simply to contact the touch sensor, whereas in the input device 1, execution of predetermined processing starts when data based on pressure accompanying contact satisfies a predetermined standard. Note that due to this difference, as described above, the start of undesired processing based on an operation when the user unintentionally performs light contact can be avoided, and furthermore, the user can be provided with a realistic tactile sensation.

FIG. 4B shows the point at which display has changed from FIG. 4A to a confirmation screen. FIG. 4B illustrates a state such that the user is still pressing a location at which the "input complete" object originally existed, yet at which no object exists anymore, and the data based on pressure still satisfies the predetermined standard. Thereafter, as illustrated in FIG. 4B, suppose that the user has provided slide input to the "correction" object while the data based on pressure still satisfies the predetermined standard. In this state, however, predetermined processing (step S14) has already been executed, and the processing of the present embodiment is complete. Therefore, the input device 1 executes neither the "transfer" processing nor the "correction" processing. In this way, with the input device 1 of the present embodiment, even when slide input slides to the position of an object while the data based on pressure still satisfies the predetermined standard, predetermined processing is not executed, thereby preventing execution of processing based on an input operation not intended by the user.

Figure 4C:
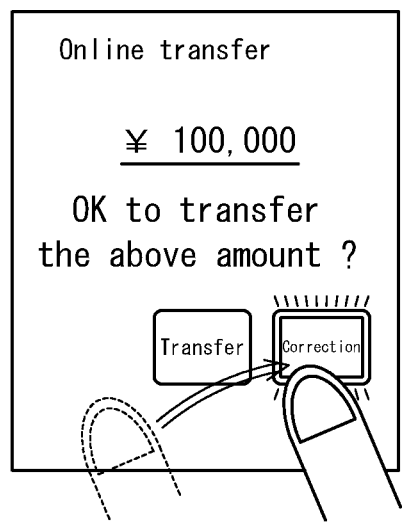
Figure 4D:
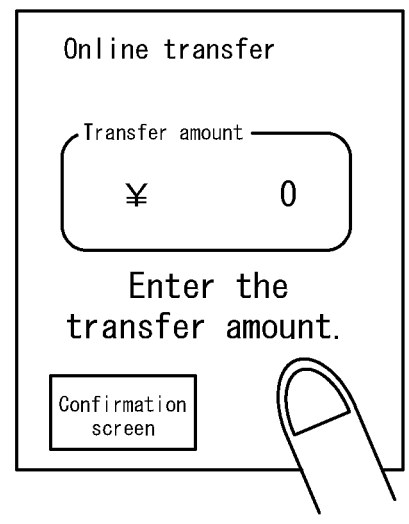

Note that in this case, the user can cause the input device 1 to execute "correction" processing by first releasing the finger or the like from the touch sensor 11 to break contact, then contacting the "correction" object anew as illustrated in FIG. 4C and causing the data based on pressure accompanying the contact to satisfy the predetermined standard. Contact to the "correction" object is detected anew (step S11), and once the data based on pressure accompanying the contact satisfies the predetermined standard (step S12), the input device 1 provides a tactile sensation (step S13) and executes processing corresponding to the "correction" object as illustrated in FIG. 4D (step S14).

Embodiment 2

Next, an input device according to Embodiment 2 of the present invention is described. The input device according to Embodiment 2 can be achieved with the same structure as the input device 1 described in Embodiment 1 and represents a partial modification to the processing by the control unit 15 described in Embodiment 1. Accordingly, description identical to Embodiment 1 is omitted as appropriate.

When, in the above-described Embodiment 1, slide input slides to the position of an object while the data based on pressure still satisfies the predetermined standard, Embodiment 2 allows the user to perform an input operation for the object to which the user has slid the finger or the like without release from the touch sensor 11.

Figure 5:
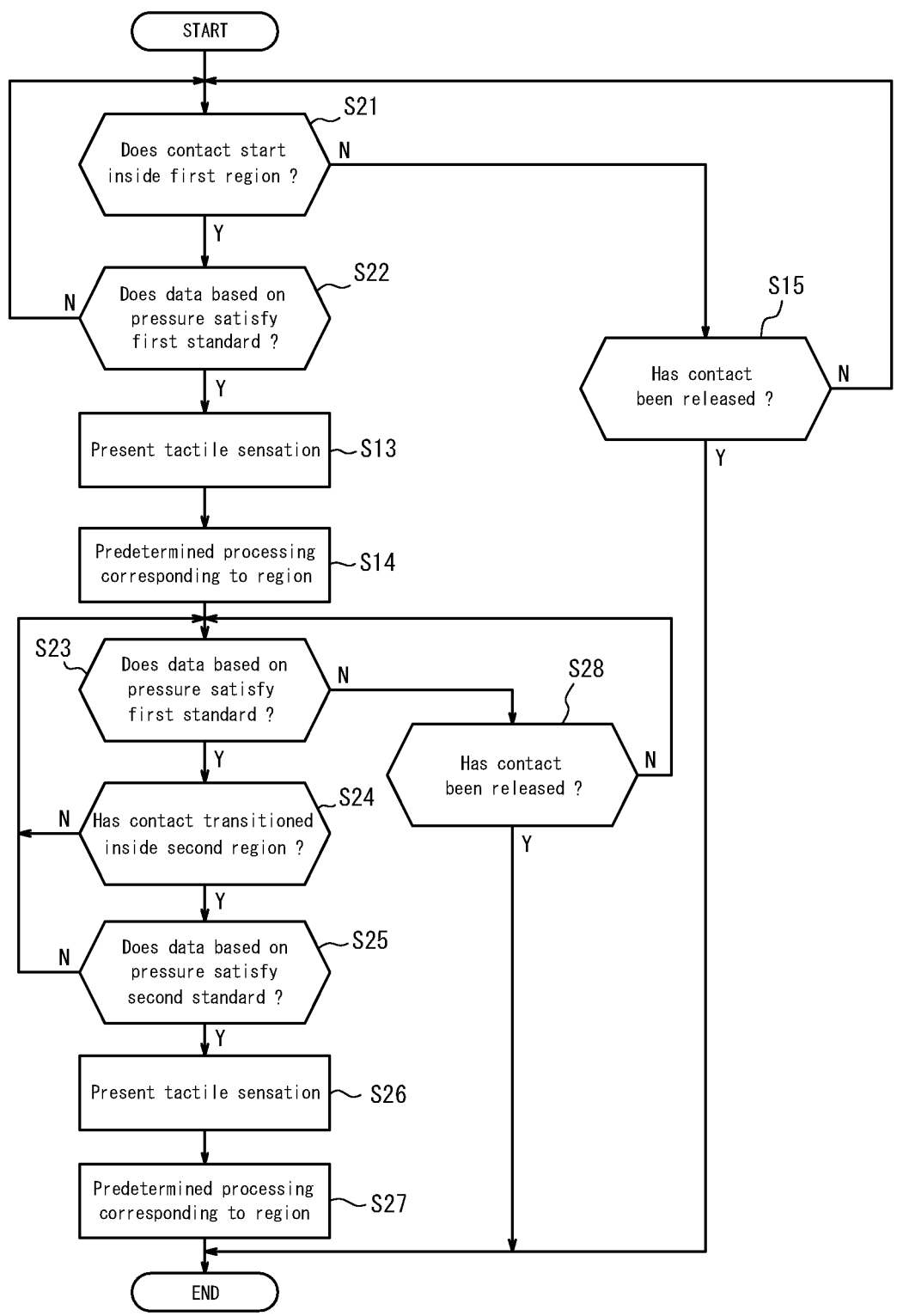
FIG. 5 is a flowchart illustrating processing by an input device according to Embodiment 2.

FIG. 5 is a flowchart illustrating control processing for slide input in the input device according to Embodiment 2. For the flowchart in FIG. 5, a description of steps similar to the flowchart for the input device according to Embodiment 1 as described in FIG. 3 is omitted as appropriate.

The "predetermined region" in step S11 of the flowchart in FIG. 3 becomes a "first region" in FIG. 5 (step S21). Furthermore, the "predetermined standard" in step S12 of the flowchart in FIG. 3 becomes a "first standard" in FIG. 5 (step S22). After step S14 of the flowchart in FIG. 3, FIG. 5 also includes steps S23 through S28.

In Embodiment 2, two types of the predetermined region described in Embodiment 1 are set. For the sake of convenience, these are distinguished as the first region and the second region. The first region can be considered substantially the same as the "predetermined region" described in Embodiment 1. The second region is assumed to be a region corresponding to a location where an object for which contact is to be detected, such as a key or the like, is displayed on the display unit 14 after execution of predetermined processing (step S14) as described in Embodiment 1.

In Embodiment 2, two types of the predetermined standard are also set. For the sake of convenience, these are distinguished as the first standard and the second standard. The first standard can be considered substantially the same as the "predetermined standard" described in Embodiment 1. In Embodiment 2, the second standard is set in advance to be a higher standard than the first standard. As the second standard, a standard corresponding to a value of 2 N (newtons) or the like, for example, is preferably set in advance taking into consideration data based on pressure when the user performs an operation by pushing strongly, and the setting can preferably be changed subsequently.

In Embodiment 2, in a state such that the touch sensor 11 detects contact in the first region (step S21), when the data based on pressure detected by the pressure detection unit 12 satisfies the first standard (step S22), the control unit 15 performs control to provide a tactile sensation (step S13) and to execute predetermined processing corresponding to the first region (step S14), which is nearly identical to Embodiment 1. Furthermore, when the contact is determined to be detected outside the first region in step S11, the control unit 15 determines whether contact has been released (step S15), returning to step S11 and continuing processing when the contact has not been released and terminating the processing of the present embodiment when the contact has been released. These steps are also similar to Embodiment 1.

In Embodiment 2, after execution of predetermined processing corresponding to the first region in step S14, the control unit 15 determines whether the data based on pressure detected by the pressure detection unit 12 satisfies the first standard (step S23). When the data based on pressure satisfies the first standard in step S23, the control unit 15 determines whether slide input that transitions from outside the second region to inside the second region has been detected while the data based on pressure still satisfies the first standard (step S24). In other words, in step S24, it is determined whether the user has provided slide input that starts with contact at a location displaying an object (in the first region) for which contact is detected, and after execution of predetermined processing, reaches a region corresponding to a location displaying an object (in the second region) for which contact is detected while the data based on pressure accompanying the contact continues to satisfy the first standard.

When slide input such that the position of contact transitions to inside the second region while the data based on pressure still satisfies the first standard is not detected in step S24, the control unit 15 returns to step S23 and continues processing. On the other hand, when slide input such that the position of contact transitions to inside the second region while the data based on pressure still satisfies the first standard is detected in step S24, the control unit 15 determines whether the data based on pressure detected by the pressure detection unit 12 satisfies the second standard, which is higher than the first standard (step S25).

When the data based on pressure detected by the pressure detection unit 12 does not satisfy the second standard in step S25, the control unit 15 returns to step S23 and continues processing. On the other hand, when the data based on pressure detected by the pressure detection unit 12 satisfies the second standard in step S25, the control unit 15 performs control to provide a tactile sensation (step S26) and to execute processing corresponding to the second region (step S27).

Conversely, when the data based on detected pressure does not satisfy the first standard in step S23, the control unit 15 determines whether contact has been released (step S28). When contact has not been released in step S28, the control unit 15 returns to step S23 and continues processing, whereas when contact has been released, the control unit 15 terminates the processing of the present embodiment.

An example of a form of processing by the input device according to Embodiment 2 is now described, again using FIGS. 4A to 4D.

As illustrated in FIG. 4B, Embodiment 2 is the same as Embodiment 1 in that even if the user provides slide input to the "correction" object while the data based on pressure still satisfies the first standard, the input device 1 executes neither the "transfer" processing nor the "correction" processing. Subsequently, however, if an input operation for which data based on pressure satisfies the second standard, which is higher than the first standard, is performed on the "correction" object (step S25), the input device 1 executes processing allocated to the "correction" object, as illustrated in FIG. 4C (step S27). In other words, as illustrated in FIG. 4D, the input device 1 executes processing for "correction" (step S27).

FIGS. 6A to 6D schematically illustrate another example of a form of processing by the input device according to Embodiment 2. According to the input device 1 of Embodiment 2, even if slide input is provided to an object while the data based on pressure accompanying contact still satisfies the first standard, execution of processing corresponding to the object does not start. In Embodiment 2, however, after the slide input to a position corresponding to a location at which an object is displayed, execution of processing corresponding to the object starts upon provision of operation input for which data based on pressure accompanying contact satisfies the second standard.

Figure 6A:
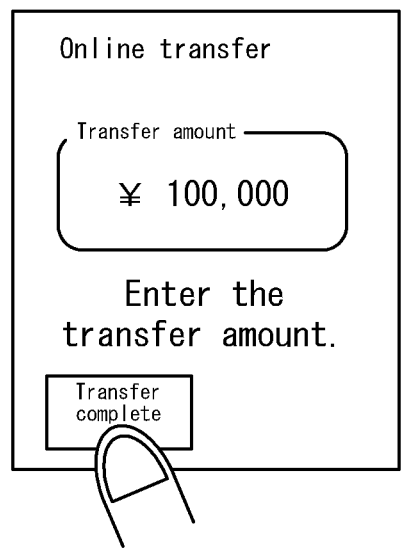
FIGS. 6A to 6D schematically illustrate an example of a form of processing by the input device according to Embodiment 2.
Figure 6B:
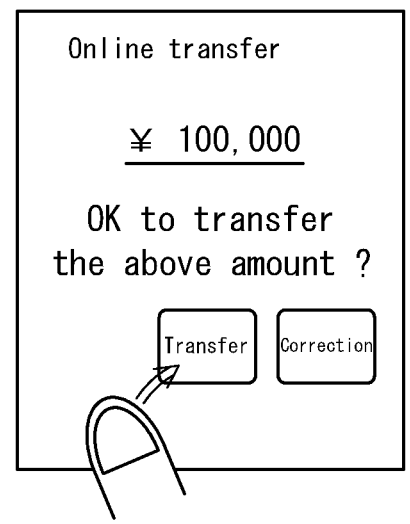
Figure 6C:
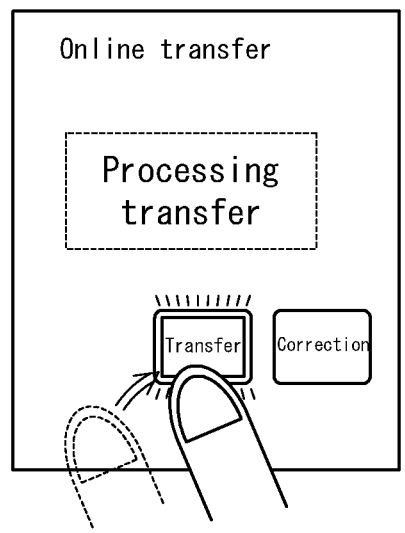
Figure 6D:
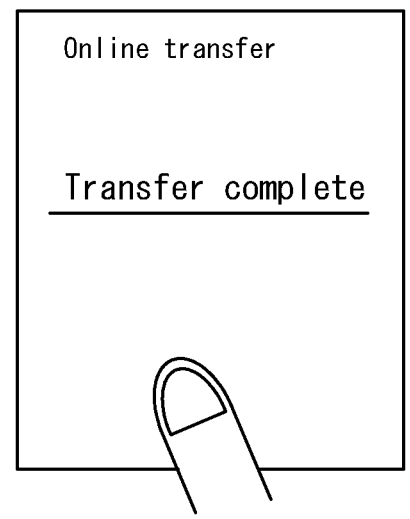

Accordingly, even if slide input is provided to the "transfer" object in FIG. 6B while the data based on pressure accompanying contact to the "input complete" object in FIG. 6A still satisfies the first standard, the input device 1 can start execution of processing corresponding to the "transfer" object. In other words, when the data based on pressure accompanying contact to the "transfer" object satisfies the second standard, the input device 1 starts execution of processing corresponding to the "transfer object", as illustrated in FIG. 6C. FIG. 6D illustrates how transfer processing is thus completed.

In this way, the input device 1 according to Embodiment 2 can start execution of processing corresponding to an object even after slide input. Therefore, according to the input device 1 of Embodiment 3, without releasing the finger or the like from the touch sensor 11 after slide input, the user can cause execution of processing corresponding to an object to start after slide input with a smooth, sequential operation.

Embodiment 3

Next, an input device according to Embodiment 3 of the present invention is described. The input device according to Embodiment 3 can be achieved with the same structure as the input device 1 described in Embodiment 2 and represents a partial modification to the processing by the control unit 15 described in Embodiment 2. Accordingly, description identical to Embodiment 2 is omitted as appropriate.

Figure 7:
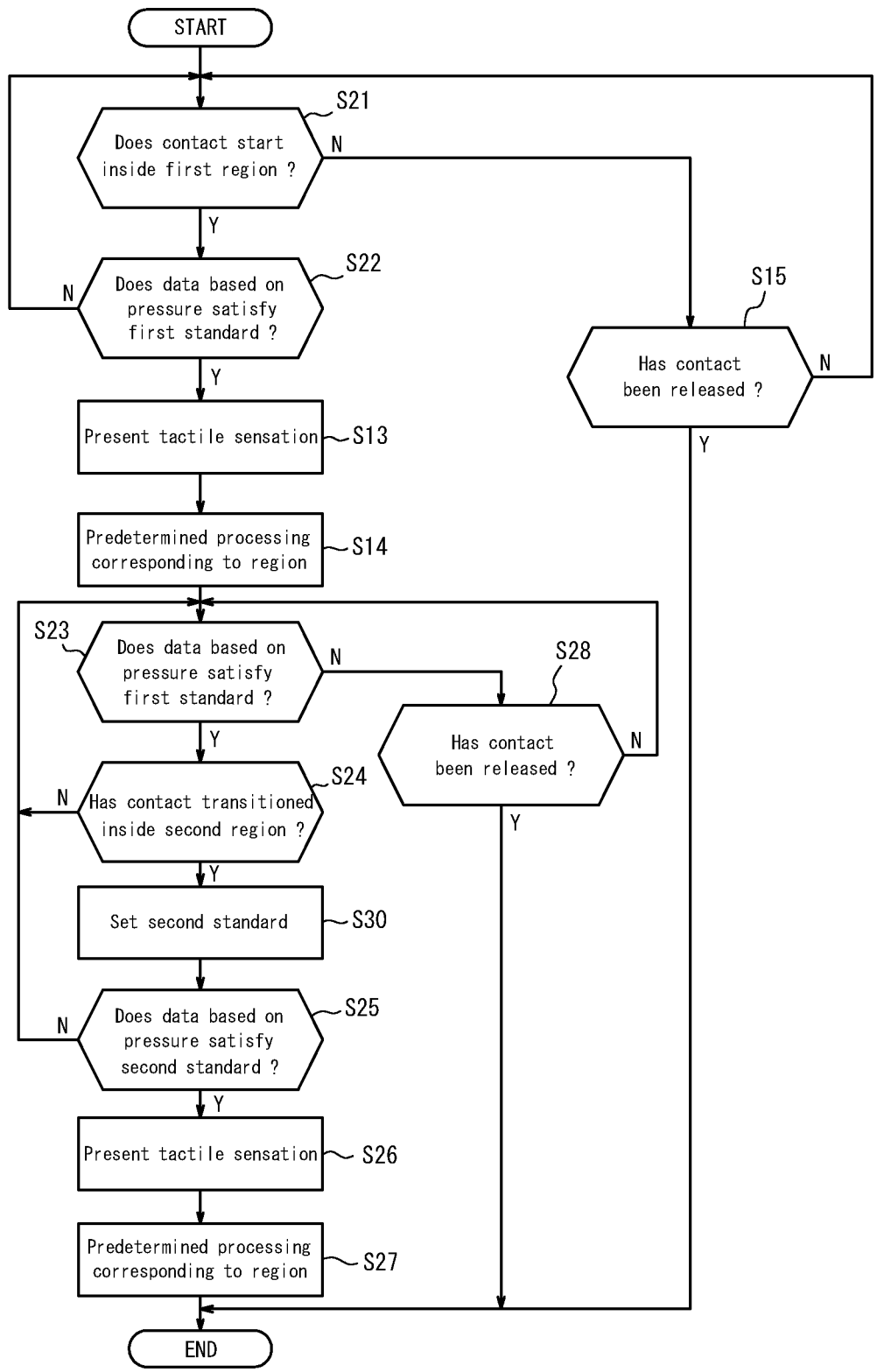
FIG. 7 is a flowchart illustrating processing by an input device according to Embodiment 3.

FIG. 7 is a flowchart illustrating control processing for slide input in the input device according to Embodiment 3. Control processing for slide input according to Embodiment 3 adds the processing in step S30 after step S24 in Embodiment 2 as described in FIG. 5.

From step S23 to step S24 in Embodiment 3, when the data based on pressure detected by the pressure detection unit 12 satisfies the first standard, the "data based on pressure satisfying the first standard" is stored in a memory unit internal to the control unit 15. In step S24, after detecting slide input that transitions to inside the second region while the data based on pressure still satisfies the first standard, the control unit 15 sets the second standard in accordance with the data based on pressure satisfying the first standard (step S30). In step S30, the control unit 15 can set the second standard by processing such as adding a predetermined value to the average of the data based on pressure that accompanies contact when slide input is provided and that satisfies the first standard. A variety of other algorithms may also be used to set the second standard. With such processing, the second standard need not be set in advance, and furthermore, the second standard can be set to match the pressure force of each user.

In this way, the input device 1 according to Embodiment 3 can detect a similar user input operation as the above-described Embodiment 2. Furthermore, as a function of the pressure force of each user, the input device 1 according to Embodiment 3 can change the standard to be satisfied by data based on pressure in order to start processing corresponding to an object after slide input. Therefore, the input device 1 according to Embodiment 3 can further enhance operability.

In the above explanation, the predetermined standard has been viewed as a "threshold for data based on pressure", and it is determined that the "standard is satisfied" when the standard is reached. Forms of determining whether the standard is satisfied are not, however, limited in this way, and a variety of embodiments are envisioned as being included. For example, it may be determined that the "standard is satisfied" when data based on pressure accompanying user contact to an object exceeds the standard. It may also be determined that the "standard is satisfied" when data based on pressure detected by the pressure detection unit 12 indicates the standard.

In the above explanation, the same holds true for the form of determining that the "standard is not satisfied". In other words, in the above explanation, it is determined that the standard is not satisfied in the case of being less than the standard. It may also, however, be determined that the "standard is not satisfied" when data based on pressure accompanying user contact to an object is equal to or less than the standard. Furthermore, it may also be determined that the "standard is not satisfied" when data based on pressure detected by the pressure detection unit 12 ceases to indicate the standard.

Note that the present invention is not limited to the above-described embodiments, and a variety of modifications and changes are possible. For example, in the above-described embodiments, when data based on pressure satisfies a predetermined standard, the user is caused to recognize that the input operation has been properly detected by the tactile sensation providing unit 13 providing a tactile sensation. In such a case, however, instead of providing a tactile sensation, or along with provision of a tactile sensation, the user may be caused to recognize that the input operation has been detected by, for example, an audio output unit generating a particular sound. Furthermore, in the above case, the user may be caused to recognize that an input operation has been detected by some sort of change in the display on the display unit 14.

The invention claimed is:

1. An input device, comprising:
a touch sensor;
a display unit configured to display an object; and
a control unit configured to, while an entirety of the object is displayed on the display unit,
execute predetermined processing in response to a determination that a contacting object presses onto the object corresponding to a predetermined region of the touch sensor, and
not execute the predetermined processing, in response to a determination that (i) the contacting object, while pressing the touch sensor, slides onto the object from outside the predetermined region where a slide operation of the contacting object starts to inside the predetermined region where the slide operation of the contacting object ends, and (ii) then the contacting object is released from the predetermined region to outside the predetermined region,
wherein after the predetermined processing is not executed, the control unit is configured to execute the predetermined processing in response to a determination that the contacting object releases from the predetermined region to outside the predetermined region and then presses again onto said object.

2. A method of controlling an input device including a touch sensor and a display unit, said method comprising:
displaying an object on the display unit;
while an entirety of the object is displayed on the display unit,
executing predetermined processing in response to a determination that a contacting object presses onto the object corresponding to a predetermined region of the touch sensor;
not executing the predetermined processing, in response to a determination that (i) the contacting object, while pressing the touch sensor, slides onto the object from outside the predetermined region where a slide operation of the contacting object starts to inside the predetermined region where the slide operation of the contacting object ends, and (ii) then the contacting object is released from the predetermined region to outside the predetermined region; and
after the predetermined processing is not executed, executing the predetermined processing in response to a determination that the contacting object releases from the predetermined region to outside the predetermined region and then presses again onto said object.

3. An input device, while an entirety of an object is displayed, being configured to
execute predetermined processing in response to a determination that a contacting object presses onto the displayed object corresponding to a predetermined region of a touch sensor, and
not execute the predetermined processing, in response to a determination that (i) the contacting object, while pressing the touch sensor, slides onto the displayed object from outside the predetermined region where a slide operation of the contacting object starts to inside the predetermined region where the slide operation of the contacting object ends, and (ii) then the contacting object is released from the predetermined region to outside the predetermined region
wherein after the predetermined processing is not executed, the control unit is configured to execute the predetermined processing in response to a determination that the contacting object releases from the predetermined region to outside the predetermined region and then presses again onto said object.

* * * * *